United States Patent Office 3,634,304
Patented Jan. 11, 1972

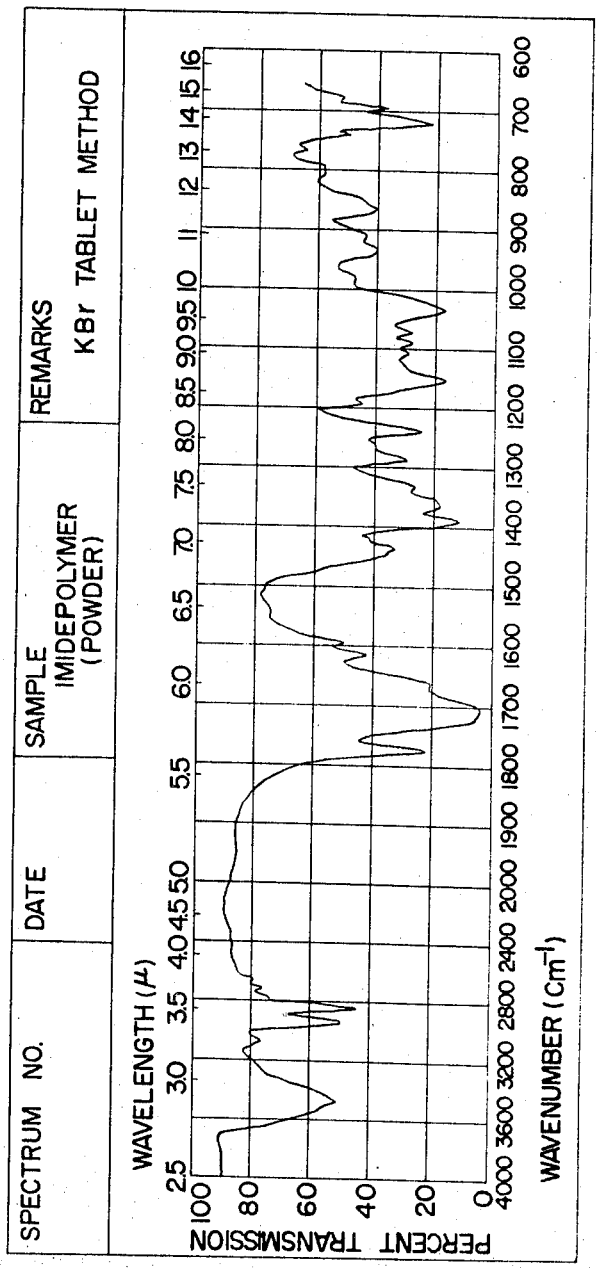

3,634,304
NOVEL POLYIMIDES AND COMPOSITIONS THEREOF THAT ARE SOLUBLE IN PHENOLIC SOLVENTS
Munehiko Suzuki, Yokosuka-shi, Etsuo Hosokawa, Yokohama-shi, and Misao Waki, Kawasaki-shi, Japan, assignors to Showa Densen Denran Kabushiki Kaisha, also known as Showa Electric Wire and Cable Co., Ltd., Kanagawa-ken, Japan
Filed May 21, 1969, Ser. No. 826,491
Int. Cl. C08g 20/32, 41/04, 51/34
U.S. Cl. 260—33.4 P                    4 Claims

ABSTRACT OF THE DISCLOSURE

A polyimide having a recurring structural unit of the formula

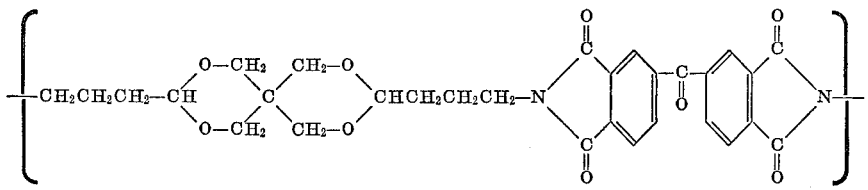

can be produced by causing a 3,3',4,4'-benzophenonetetracarboxylic acid compound and 3,9-bis(3-aminopropyl)-2,4,8,10-tetraoxaspiro[5,5]undecane to contact each other under conditions conducive to condensation. Such a polyimide is blended with a convertible polyester and a phenolic solvent to produce a composition which is suitable for use as an electrically insulating varnish forming a coating film of highly desirable properties.

BACKGROUND OF THE INVENTION

This invention relates generally to polyimides and compositions thereof and more particularly to new polyimides derived from 3,3',4,4'-benzophenonetetracarboxylic acid and 3,9-bis(3-aminopropyl)-2,4,8,10-tetraoxaspiro[5,5]undecane and new compositions produced by dissolving these imides and convertible polyesters in phenolic solvents.

Furthermore, this invention in still another aspect thereof relates to improvements in electrically insulating varnishes and more specifically to new insulating varnishes of polyimide resins which have high stability and are capable of forming coating films having, simultaneously, excellent heat resistance and mechanical properties, and for which, moreover, inexpensive phenolic solvents can be used as varnish solvents.

In recent years continual efforts have been directed toward miniaturization of size, elevation of performance, and expansion of fields of applications of electrical machines and equipment, such as motors and generators, in which coils are used. In accordance with this trend, there has grown a demand for development of so-called magnet wires which can be used even at high temperatures.

As an insulating varnish for a heat-resistant enameled wire of this character, so-called polyimide resin insulating varnishes, each prepared by causing an aromatic tetracarboxylic acid dianhydride and an aromatic diamine to react in an organic polar solvent at a temperature below 50 degrees C. and obtaining a polyamide acid solution, have been known.

When such a conventional polyimide resin insulating varnish is applied onto an electroconductive material such as copper wire or an aluminum wire and baked, the polyamide acid undergoes dehydrocyclization and converts into a polyimide, thereby forming an insulating varnish film of high heat resistance.

While these known polyimide resin insulating varnishes have excellent properties once they are applied and baked, they are accompanied by certain difficulties. One difficulty is the high price of the varnish due to the solubility of the polyamide acid constituting the predominant constitutent thereof in only expensive organic polar solvents. Another difficulty is the extreme instability of the polyamide acid, which readily converts into an insoluble polyimide even at room temperature, giving rise to gelation of the varnish, whereby the varnish must be stored under refrigeration. Such difficulties are industrially disadvantageous features of these known insulating varnishes.

Accordingly, the reaction for producing such a polyamide acid has heretofore been carried out at low temperatures, at which the tetracarboxylic acid does not react with the diamine unless it is in the state of a dianhydride. For this reason, it is disadvantageously necessary to heat the tetracarboxylic acid dianhydride for a long time prior to carrying out the reaction thereby to drive off thoroughly the adsorbed water.

Inventions relating to polyimides obtained by heating and causing reaction of an aromatic tetracarboxylic acid and an aliphatic diamine are disclosed in U.S. Pat. 2,710,853 (patented June 14, 1955, Polyimides of Pyromellitic Acid) and U.S. Pat. 2,731,447 (patented Jan. 17, 1956, Novel Polyimides). The polyimides of these inventions, however, have very low solubility of organic solvents and cannot be used in practice as constituents of insulating varnishes.

Furthermore, baked varnish films obtained through the use of the above described known insulating varnishes of polyimide resins are deficient in various mechanical properties beginning with wear resistance, whereby when a magnet wire on which any of these varnishes has been applied and baked is wound into a coil by an automatic winding operation, there is a tendency for the varnish film to be damaged.

Heretofore, the technique of improving the various properties of an insulating varnish film by admixing one or more resins amply possessing the desired properties with the insulating paint has been known. However, known polyimide resin insulating varnishes as described above have no mutual solubility whatsoever with resins such as convertible polyesters which have excellent mechanical properties. Consequently, it has not been possible to resort to the above mentioned technique of improving varnish film properties in the case of the above described known polyimide resin varnishes.

In view of the above described state of the art, we have studied the above described problems. As a result we have discovered that polyimides derived from a certain tetracarboxylic acid and a certain diamine are readily soluble in inexpensive phenolic solvents and that, moreover, convertible polyesters can be dissolved in large quantities in the resulting polyimide solutions, whereby it is possible to produce an insulating varnish capable of forming an insulating varnish film which possesses, simultaneously, heat resistance and excellent mechanical properties.

SUMMARY OF THE INVENTION

It is therefore an object of the present invention to provide polyimides which are soluble in phenolic solvents.

Another object of the invention is to provide compositions each comprising a polyimide of the above stated character, a convertible polyester, and a phenolic solvent.

A further object of the invention is to provide insulating varnishes of new polyimide resins each having, as principal constituents thereof, a polyimide and at least one polyester.

According to the present invention in one aspect thereof, briefly summarized, there is provided polyimides each having a recurring structural unit of the formula aminopropyl) - 2,4,8,10 - tetraoxaspiro [5,5] undecane of the formula $H_2N \cdot CH_2 \cdot CH_2$.

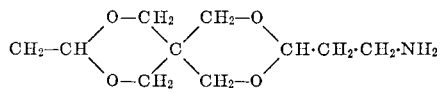

(hereinafter designated by the abbreviation BTU) together with a phenolic solvent in proportions such that the sum of the quantities of the two first-named components (i.e., BTA or a functional derivative thereof or a lower alkylester of BTA and BTU) is from 5 to 60 percent by weight of the total sum of the entire batch thus blended; placing the batch in a suitable reaction vessel; and agitating the batch for a period of from 1 to 6 hours at a temperature above 80 degrees C.

The mol ratio of the above mentioned two components need not strictly be equal. Rather, a blend in which the quantity of one reaction component is somewhat in excess of that of the other component is even more preferable.

However, if the difference between these quantities is excessive, the degree of polymerisation of the polyimide produced will be restricted with the result that the characteristics of the baked coating film of the insulating varnish will be impaired. Accordingly, this difference is preferably held within 10 mol percent of the smaller quantity.

We have found further that when the quantity of the reaction solvent is excessively large relative to that of the reactants, the reaction does not progress thoroughly. On the other hand, when the quantity of the solvent is deficiently small, the concentration of the resulting polyimide solution becomes excessively high, which result is undesirable since it becomes difficult for the convertible

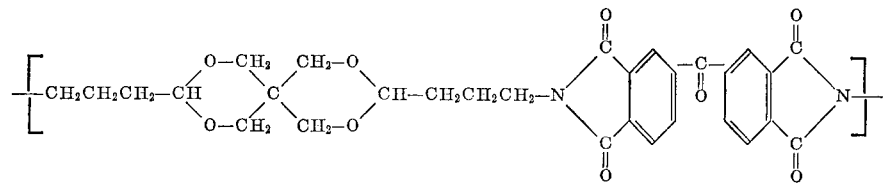

polyester added in the succeeding process step to dissolve.

In this reaction, furthermore, the reaction temperature has a great influence on the progress of the reaction.

More specifically, this polyimide-forming reaction may be considered to take place in accordance, for example, with the following dehydration reactions of two steps (dehydration and dealcoholisation reactions in the case wherein a lower alkylester is used).

According to the present invention there is further provided a method for producing polyimides of the above stated character.

According to the present invention, in still another aspect thereof, there are provided compositions each comprising as a blend a polyimide of the above stated character, a convertible polyester, and a phenolic solvent. One application of these compositions is their use as electrically insulating varnishes.

The nature, details, and utility of the invention will be more clearly apparent from the following detailed description beginning with general considerations and concluding with specific examples of practice constituting preferred embodiments of the invention.

BRIEF DESCRIPTION OF THE DRAWING

In the accompanying drawing, the single figure is an infrared analysis chart of a polyimide suitable for use according to the invention.

DETAILED DESCRIPTION

A polyimide according to the invention can be produced, in general, by: blending 3,3', 4,4'-benzophenonetetracarboxylic acid (hereinafter designated by the abbreviation BTA), a functional derivative thereof as, for example, a dianhydride of BTA(hereinafter designated by the abbreviation BTDA), or a lower alkylester of BTA, and approximately the same mol quantity of 3,9-bis(3-

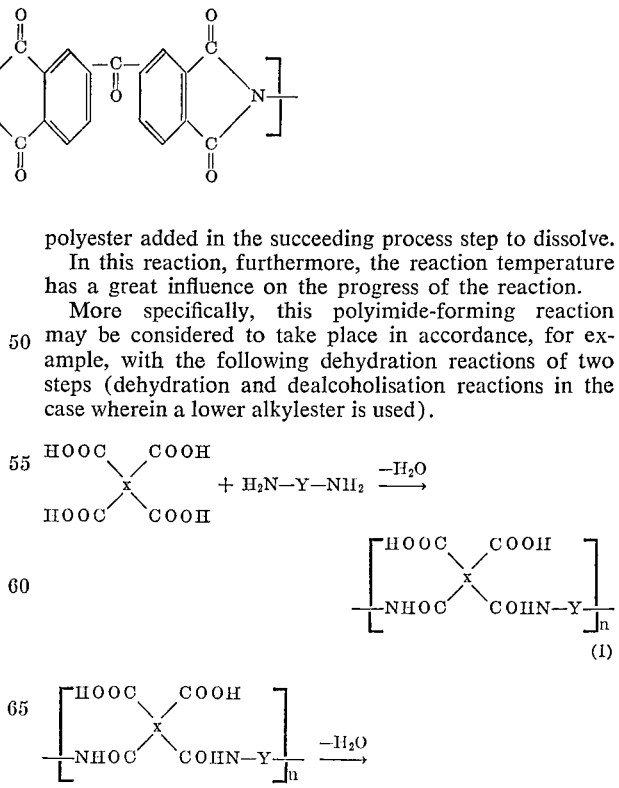

where x represents

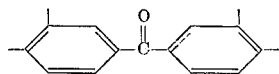

and Y represents —$CH_2 \cdot CH_2 \cdot CH_2$.

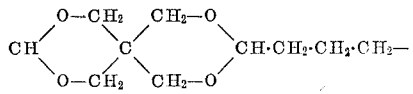

We have found that when the reaction temperature is below 80 degrees C., the reaction indicated by Formula II progresses with difficulty, and the reaction solution becomes one in which the proportion of the polyamide acid is high. As a result, the mutual solubility with the convertible polyester added in the succeeding process step is lowered, and, in addition, blisters or pin holes tend to be formed in the coating film since dehydration occurs at the time of baking of the varnish film.

Furthermore, since the reaction of Formula I is also a dehydration reaction, the reaction system will reach an equilibrium state if it is difficult for the separated water to escape out of the system, whereby it will be difficult to obtain a polyimide of high molecular weight.

Accordingly, it is preferable that the above described reaction be carried out at a temperature above 100 degrees C. and below the boiling point (from 200 to 220 degrees C.) of the solvent.

When the reaction is carried out under reduced pressure a reaction temperature which is lower than that in the case of reaction at atmospheric pressure can be used. Furthermore, the reaction temperature can be temporarily lowered below 80 degrees C. during the reaction process without any adverse effect.

A polyimide produced in the above described manner is characterised by an infrared analysis chart as shown in the accompanying illustration and readily dissolves in a wide range of proportions in phenolic solvents. Examples of such phenolic solvents are phenol, xylenol, and cresol. Poor-solvents such as naphtha, toluene, and xylene can also be used when the additive quantities thereof are below 60 percent.

The polyimide thus produced, in general, is substantially totally soluble (at 30 degrees C.) in the phenolic solvent and, in general, has a relative viscosity (0.5 g. polymer/100 ml. m-cresol, 30 degrees C.) higher than 0.1. The m-cresol used for this relative viscosity and the examples of practice to follow was of the following composition.

|  | Percent |
| --- | --- |
| Phenol | 3.2 |
| o-Cresol | 3.3 |
| p-Cresol | 39.6 |
| m-Cresol | 53.9 |

A polyimide produced in the above described manner, in the form of a solution, can be used directly, as it is, as an insulating varnish capable of forming a heat-resistant coating film. However, the baked coating film resulting from this solution is not always completely satisfactory in mechanical properties.

In accordance with the present invention, for the purpose of improving these mechanical properties of the baked coating film, a known convertible polyester or a solution of a convertible polyester in an organic solvent, that is, a polyester insulating varnish, is further added to the above mentioned polyimide solution, and the resulting combination is uniformly mixed. At this time, a diisocyanate or isocyanate generator may, of course, be added simultaneously together with the convertible polyester.

The convertible polyester added in this manner is mutually dissolved with the polyimide solution in almost any ratio to impart a substantial improvement in the properties of the product over those of the polyester insulating varnish by itself or those of the polyimide solution by itself even when, with respect to 100 parts by weight of the resin content within the polyimide solution, a small quantity of the order of 10 parts by weight of the convertible polyester is added or, conversely, when a large quantity thereof of the order of 1,000 parts by weight is added.

The quantity of the diisocyanate or isocyanate generator to be added is preferably less than 50 parts by weight with respect to 100 parts by weight of the resin content of the insulating varnish (polyimide solution plus convertible polyester).

The term "convertible polyester" is herein used to designate a so-called primary condensate which is soluble in a phenolic solvent and has heretofore been used as the polyester component of polyester insulating varnishes, and which is a polyester capable of undergoing further condensation reaction under the action of heat and (or) a catalyst to be converted into a cross-linked structure. This convertible polyester can be prepared, in general, by heating and causing reaction of a mixture of suitable proportions of a dicarboxylic acid, a divalent alcohol, and an alcohol or an acid of a valency of three thereabove as a cross-linking component in a phenolic solvent.

Therefore, this polyester is one which has a hydroxyl group and a carboxyl group which are capable of reacting further to form a three-dimensional network and are in a free state or a state wherein the reactivity thereof is blocked because of etherification or esterification with a lower alcohol.

Examples of dicarboxylic acids suitable for use as one of the above enumerated starting materials are terephthalic acid, isophthalic acid, adipic acid, pimelic acid, and suberic acid. In addition, lower alkylesters of these acids can be similarly used. Examples of suitable divalent alcohols are ethylene glycol, diethylene glycol, trimethylene glycol, tetramethylene glycol, butanediol, and 2,2′-dimethyl-1,3-propanediol. Examples of trivalent or higher valency alcohols or acids are glycerine, trimethylolpropane, pentaerythritol, tris (hydroxymethyl) isocyanurate, diglycerol, cyanuric acid, isocyanuric acid, and trimellitic acid. Lower alkylesters of these acids can be similarly used.

Among the various possible combinations of the above described starting materials, one suitable combination we have found comprises approximately equal quantities of terephthalic acid, ethylene glycol, and glycerine. We have found further that substitution of a portion of this combination with another acid or alcohol also produces desirable results.

Furthermore, the convertible polyester in the present invention includes those of modified as, for example, a polyester prepared by further adding a small quantity of a reactant such as an unsaturated fatty acid to the starting materials, as set forth in the specification of British Pat. 1,088,323, or a convertible polyester already produced to which a modifier such as a diisocyanate has been added.

A convertible polyester suitable for use according to the invention can be produced as illustrated by the following specific example of procedure. The above described starting materials, together with a phenolic solvent in a quantity of the order of 20 percent by weight of the total weight thereof, are placed in a suitable reaction vessel and heated from room temperature to a maximum temperature of from 230 to 250 degrees C. at a temperature rise rate corresponding to a time of from 6 to 9 hours for this temperature rise thereby to produce the convertible polyester as a reaction product.

While this reaction is completed after the reactants have been heated to a final temperature of approximately 230 to 250 degrees C., the molecular weight of the reaction product thus produced can be further increased by maintaining the product at the final temperature for a period of from 1 to 4 hours. It is necessary, however, to cause the reaction to stop prior to the start of gelation of the resin formed in carrying out this procedure of holding the reaction product at the final temperature. For this purpose, a phenolic solvent is poured onto the heated convertible polyester. The convertible polyester obtained in this manner is then filtered to remove foreign matter and then used.

Convertible polyesters of the above described character suitable for use according to the invention include polyester resin solutions, i.e., polyester insulating varnishes sold on the market under trademark or product names such as: Alkanex (General Electric Company, U.S.A.), Terebec (Farbenfabriken Bayer AG, Germany), each of which is a polyester insulating varnish synthesised from dimethyl terephthalate, ethylene glycol, and glycerine; Isonel (Schenectady Varnish Company, U.S.A.), which is a polyester insulating varnish synthesised from terephthalic acid, ethylene glycol, glycerine, and tris (hydroxyethyl) isocyanurate; and Desmophen (Farbenfabriken Bayer AG, Germany).

Examples of diisocyanate or isocyanate generators suitable for adding to the insulating varnishes of the invention are diphenylmethane-4,4'-diisocyanate, diphenylether-4,4'-diisocyanate, diphenylsulphide-4,4'-diisocyanate, diphenylsulphone - 3,3'-diisocyanate, diphenylbenzene-4,4'-diisocyanate, tolylene diisocyanate, hexamethylene diisocyanate, octamethylene diisocyanate, phenolic stabilisers of these diisocyanates, and isocyanates sold on the market under product names such as Desmodur AP Stable, Desmodur CT Stable, Desmodur T, Desmodur N, Desmodur TH, and Desmodur R (Farbenfabriken Bayer AG, Germany).

The preparation of the polyimides for use in accordance with the invention will be disclosed hereinafter with respect to a specific example of method. As mentioned hereinbefore, while the BTA itself can be used in its acid form, an anhydride or a lower alkylester thereof can be similarly used.

Accordingly, not only BTA but also BTDA and tetra-alkylesters of BTA can be isolated with purities above 99 percent, but it is difficult, strictly speaking, to isolate the monoanhydride and mono-, di-, and tri-alkylesters of BTA. Therefore, these compounds will be identified by their acid values or degrees of esterification in the following examples.

Accordingly, a mixture of 1 mol of BTA and 1 mol of BTDA will be considered to be identical to BTA monoanhydride. Furthermore, a mixture of 1 mol of BTA and 1 mol of a tetra-alkylester of BTA, a mixture of 1 mol of a mono-alkylester of BTA and 1 mol of a trialkylester of BTA, and a mixture of 1 mol of BTA, 1 mol of a mono-alkylester of BTA, 1 mol of a di-alkylester of BTA, 1 mol of a tri-alkylester of BTA, and 1 mol of a tetra-alkylester of BTA will each be considered to be identical to a di-alkylester of BTA.

The acid values and other characteristics of BTA and anhydrides and lower alkylesters of BTA are set forth in Table 1.

TABLE 1

| Compound | Abbreviation | Acid value | Degree of esterification | Molecular weight |
|---|---|---|---|---|
| 3,3',4,4'-benzophenonetetra-carboxylic acid. | BTA | 625.7 | | 358 |
| BTA dianhydride | BTDA | 696.9 | | 322 |
| BTA mono-anhydride | BTMA | 329.4 | | 340 |
| BTA monomethylester | | 451.6 | 1/4 | 372 |
| BTA dimethylester | BTAMe | 290.2 | 2/4 | 386 |
| BTA trimethylester | | 140.3 | 3/4 | 400 |
| BTA tetramethylester | | 0 | 4/4 | 414 |
| BTA monoethylester | | 430.8 | 1/4 | 390 |
| BTA diethylester | BTAE | 265.4 | 2/4 | 422 |
| BTA triethylester | | 123.3 | 3/4 | 454 |
| BTA tetraethylester | | 0 | 4/4 | 486 |

In order to indicate still more fully the nature and utility of the invention, the following specific examples of practice constituting preferred embodiments thereof and results are set forth, it being understood that these examples are presented as illustrative only and that they are not intended to limit the scope of the invention.

Example 1

322.2 grammes (g.) of BTDA, 274.4 g. of BTU, and 560 g. of xylenol were placed in a three-neck flask provided with a thermometer, a condenser, and an agitator. The temperature within the flask was then raised to 150 degrees C. as the reactants were agitated and was held at this value for two hours while the agitation was continued, the reaction being stopped when generation of water vapour completely stopped, whereupon a polyimide was obtained. The quantity of water distilled during the reaction was 35 ml.

Examples 2 through 14

In a manner similar to that set forth in Example 1, polyimides were prepared under the blending and reaction conditions set forth in Table 2.

TABLE 2

| Example No. | Acid component | Acid value | Acid component/ B.t.u. (mol ratio) | Reaction solvent (quantity blended) | Reaction conditions, temp. (° C.)× time (hr.) | Pressure of reaction system |
|---|---|---|---|---|---|---|
| 1 | BTDA | 696.9 | 1/1 | Xylenol (60%) | 150×2 | Atmospheric. |
| 2 | BTA | 620 | 1/1.1 | Metacresol (80%) | 120×2 | 10 mm. Hg. |
| 3 | BTMA | 332 | 1/1 | Phenol (40%) | 130×2 | 100 mm. Hg. |
| 4 | BTA Me | 462 | 1.1/1 | Xylenol (95%) | 170×2 | 20 mm. Hg. |
| 5 | BTA Me | 287 | 1.05/1 | Xylenol (60%) | 200×1 | Atmospheric. |
| 6 | BTA Me | 135 | 1/1.1 | do | 180×2 | 20 mm. Hg. |
| 7 | BTA Me | 0 | 1/1.05 | do | 180×2 | 20 mm. Hg. |
| 8 | BTA E | 424 | 1/1 | do | 180×2 | 20 mm. Hg. |
| 9 | BTA E | 270 | 1.1/1 | do | 180×2 | 20 mm. Hg. |
| 10 | BTA E | 120 | 1/1 | do | 180×2 | 20 mm. Hg. |
| 11 | BTA E | 0 | 1.1/1 | do | 180×2 | 20 mm. Hg. |
| 12 | BTA | 620 | 1/1 | Xylenol/naphtha =4/6 (60%). | 150×1.5 | 150 mm. Hg. |
| 13 | BTDA | 696.9 | 1.1/1 | Xylenol/xylene =9/1 (60%). | 80×1, 150×2 | Atmospheric. |
| 14 | BTDA | 696.9 | 1/1.1 | Xylenol/toluene =9.5/0.5 (60%). | 80×6 | 100 mm. Hg. |

Each of the polyimide solutions obtained in the above described manner was dropped into methanol to cause precipitation, and the precipitate was washed several times with methanol and then dried under a vacuum at room temperature, whereupon a polyimide in the form of light-yellow powder was obtained.

Infrared analysis (KBr tablet method) was carried out with respect to each of these polyimides, whereupon a chart as indicated in the accompanying illustration was obtained, and absorption of 1,715 cm.$^{-1}$ and 1,775 cm.$^{-1}$, which is a characteristic of imides, was conspicuously observable. Ultimate analysis was also carried out with results as indicated below with respect to one example, whereby it was verified that the products were the desired polyimides.

| (Element) | Measured value (percent) | Calculated value percent |
|---|---|---|
| C | 64.43 | 64.28 |
| H | 4.76 | 5.04 |
| N | 4.74 | 5.00 |

The principal properties of this polyimide were as follows.

Softening point: 195 to 210° C.
Heating loss (200° C.×1 hr.): 4.2%
Solubility (polyimide/solvent=10/90):

solution. The resulting mixture was uniformly mixed by agitation, and a suitable quantity of xylenol was thereafter added further thereto to produce a varnish-like solution having a solid content of 40 percent. This resin solution was filtered to remove foreign matter.

The filtered resin solution was then applied as a coating directly on an annealed copper wire of 1.0-mm. diameter and baked in the conventional manner at a temperature of from 350 to 450 degrees C. thereby to produce an enameled wire.

Examples 16 through 33

By the procedure set forth in Example 15 other resin solutions respectively of the blends and particulars as shown in Table 3 were produced.

TABLE 3

| Example No. | (A) Polyimide solution (Example No.) | (B) Convertible polyester or polyester varnish | (C) Diisocyanate or isocyanate generator | (D) (A)/(B)/(C) (wt. ratio of solids) | (E) Non-volatile content (percent) (200° C.×1.5 hr.) | (F) Viscosity (poise) (at 30° C.) |
|---|---|---|---|---|---|---|
| 15 | 1 | Desmophen F 950 | | 100/100/0 | 40.0 | 38.2 |
| 16 | 2 | Alkanex 9504 | | 100/10/0 | 41.2 | 41.5 |
| 17 | 3 | ....do.... | | 100/1000/0 | 40.2 | 37.4 |
| 18 | 4 | Isonel 200 | | 100/20/0 | 39.9 | 40.4 |
| 19 | 5 | Terebec F | | 100/900/0 | 42.9 | 39.5 |
| 20 | 6 | Desmophen 800 | Diphenylmethane-4.4'-diisocyanate. | 100/400/10 | 38.7 | 36.3 |
| 21 | 7 | Desmophen 900 | Diphenylether-4.4'-diisocyanate. | 100/400/1 | 41.8 | 38.5 |
| 22 | 8 | Desmophen 1000 | Diphenylsulphide-4.4'-diisocyanate. | 100/400/250 | 39.5 | 37.2 |
| 23 | 9 | Desmophen 1100 | Diphenylsulphone-4.4'-diisocyanate. | 100/400/20 | 40.7 | 40.7 |
| 24 | 10 | Desmophen 1200 | Diphenylbenzene-4.4' diisocyanate. | 100/100/10 | 40.5 | 38.6 |
| 25 | 11 | Desmophen 2000 | Tolylene diisocyanate | 100/100/10 | 40.1 | 38.1 |
| 26 | 12 | Desmophen 2100 | Hexamethylene diisocyanate. | 100/200/5 | 39.3 | 36.9 |
| 27 | 13 | Desmophen 2200 | Octamethylene diisocyanate. | 100/200/3 | 39.6 | 36.0 |
| 28 | 14 | Desmophen VL 100 | Desmodur AP, stable | 100/300/5 | 40.9 | 39.6 |
| 29 | 15 | Alkanex 9504 | Desmodur CT, stable | 100/400/10 | 38.8 | 34.5 |
| 30 | 16 | Isonel 200 | Desmodur R | 100/400/5 | 41.4 | 37.9 |
| 31 | 17 | Terebec F | | 100/50/0 | 40.7 | 41.0 |
| 32 | 18 | Isonel 200 | | 100/900/0 | 40.4 | 39.2 |
| 33 | 19 | Alkanex 9504 | | 100/100/0 | 38.6 | 35.7 |

Completely soluble: phenolic solvent, N-methyl-2-pyrrolidone
Partially soluble: cyclohexanone
Totally insoluble: toluene, methylethyl ketone, methanol, ethyl Cellosolve, acetone
Inherent viscosity (0.5% in metacresol at 30° C.): 0.73
Press formability (200° C., 10 sec., 200 atm.): becomes a brittle, glass-like structure.

The following Examples 15 through 33, inclusive, relate to insulating varnishes of polyimide resins according to the invention. While convertible polyester solutions sold on the market are used in these examples for reasons of convenience, it should be understood, of course, that the present invention is not limited to the use of only such polyesters but can be practiced with any polyester falling within the scope of convertible polyesters defined hereinbefore.

Example 15

A solution of Desmophen F 950 in xylenol was added to the polyimide solution prepared by the procedure of Example 1 in a quantity such that 100 parts of the resin content of the Desmophen solution was added with respect to 100 parts of the resin content of the polyimide The resin solutions thus produced were applied as coating on annealed copper wire of 1.0-mm. diameter similarly as in Example 15 and baked, whereby respective enameled wires were obtained. The insulating film thicknesses of these enameled wires were all within the range of from 0.046 to 0.047 mm. The characteristics of each of these enameled wires are indicated in Table 4.

For the purpose of comparison, corresponding characteristics of enameled wires, designated as Reference Examples Ref. 1 through Ref. 4, inclusive, are also shown in Table 4, these reference enameled wires being produced by applying as coating polyester insulating varnish and polyimide resin varnish independently on annealed copper wire of 1.0-mm. diameter and baking the applied varnish under the same conditions as in the other examples.

Alkanex 9504 was used in Reference Example Ref. 1, Terebec F in Ref. 2, and Isonel 200 in Ref. 3, and in Ref. 4 use was made of a polyimide resin insulating varnish (a solution in an organic polar solvent of a polyamide acid synthesised from pyromellitic acid dianhydride and 4.4'-diaminodiphenylether) sold on the market under the product name of Pire-ML (E. I. du Pont de Nemours & Co., Inc., U.S.A.).

It was found that a varnish in which a polyimide solution for use in the invention was used by itself produced a coating film which lacked bakeability and, on an annealed copper wire, developed cracks when the wire was wound around a wire of its own diameter.

TABLE 4

| | Example Number | | | | | | | | | | | | | | | | | | | | Reference | | | |
|---|---|---|---|---|---|---|---|---|---|---|---|---|---|---|---|---|---|---|---|---|---|---|---|---|
| | 15 | 16 | 17 | 18 | 19 | 20 | 21 | 22 | 23 | 24 | 25 | 26 | 27 | 28 | 29 | 30 | 31 | 32 | 33 | 1 | 2 | 3 | 4 |
| Pinholes/5 m. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | |
| Winding around own diameter | Good | Good | Good | Good | Good | Good | Good | Good | Good | Good | Good | Good | Good | Good | Good | Good | Good | Good | Good | Good | Good | Good | Good |
| Abrasion test (cycles) | 140 | 120 | 135 | 140 | 142 | 151 | 145 | 162 | 153 | 147 | 129 | 125 | 168 | 131 | 154 | 127 | 164 | 150 | 133 | 50 | 48 | 52 | 30 |
| Cut through temp. (°C.) | 280 | 270 | 280 | 270 | 280 | 270 | 300 | 295 | 290 | 280 | 295 | 290 | 300 | 300 | 290 | 290 | 290 | 300 | 290 | 230 | 230 | 240 | 300 |
| Heat shock test (diameters): | | | | | | | | | | | | | | | | | | | | | | | |
| 150° C.×2 hr. | 1 | 1 | 1 | 1 | 1 | 1 | 1 | 1 | 1 | 1 | 1 | 1 | 1 | 1 | 1 | 1 | 1 | 1 | 1 | 3 | 2-3 | 2-3 | 1 |
| 300° C.×2 hr. | 2-3 | 2-3 | 2-3 | 2-3 | 2-3 | 2-3 | 2-3 | 2-3 | 2-3 | 2-3 | 2-3 | 2-3 | 2-3 | 2-3 | 2-3 | 2-3 | 2-3 | 2-3 | 2-3 | >10 | >10 | 5-7 | 1 |
| Breakdown voltage (kv.): | | | | | | | | | | | | | | | | | | | | | | | |
| Normal state | 19.5 | 18.0 | 18.9 | 18.3 | 18.6 | 19.1 | 19.0 | 18.4 | 18.5 | 18.7 | 18.5 | 18.1 | 17.9 | 18.5 | 18.4 | 19.1 | 19.2 | 18.8 | 18.6 | 10.5 | 11.2 | 13.5 | 18.4 |
| After 24-hr. water immersion | 19.0 | 18.0 | 18.5 | 17.9 | 18.4 | 18.7 | 18.5 | 18.0 | 17.8 | 18.4 | 18.3 | 17.8 | 17.2 | 18.0 | 17.9 | 18.7 | 18.6 | 18.2 | 18.1 | 9.8 | 10.1 | 11.4 | 14.3 |
| After heating 200° C.×2 hr. | 19.0 | 17.6 | 18.6 | 18.0 | 18.2 | 18.5 | 18.7 | 18.0 | 17.6 | 18.2 | 18.2 | 17.7 | 17.3 | 17.7 | 17.9 | 18.5 | 18.7 | 18.1 | 18.0 | 9.8 | 9.9 | 10.8 | 18.0 |
| Pinholes/5 m. bending in water | 0 | 0 | 0 | 0 | 0 | 0 | 0 | 0 | 0 | 0 | 0 | 0 | 0 | 0 | 0 | 0 | 0 | 0 | 0 | (¹) | (¹) | (¹) | 0 |
| Freon 22 resistance | Good | Good | Good | Good | Good | Good | Good | Good | Good | Good | Good | Good | Good | Good | Good | Good | Good | Good | Good | (²) | (²) | (²) | Good |

¹ Large number.
² Poor.

The tests set forth in Table 4 together with the results thereof were carried out in accordance with the following procedures.

Abrasion test.—The point of a steel needle of a 0.4-mm. diameter on which a 700-g. load was applied was caused to undergo reciprocation on the coating film of each enameled wire in the longitudinal direction thereof at a measurement temperature in the range of from 10 to 30 degrees C. The number of reciprocations of the needle causing exposure of the wire conductor was taken as the measured result.

Cut through temperature.—Two lengths of each enameled wire were placed in mutually intersecting disposition. Then, with a 700-g. load imparted to the inter-section point, the two wire lengths were placed in a thermostat (or constant-temperature bath), and, as an A-C voltage of 100 volts was applied across the conductors of the two wire lengths, the interior temperature of the thermostat was raised. The temperature at which short-circuiting occurred between the two conductors was measured and taken as the cut through temperature.

Heat shock test.—Samples of each enameled wire were wound around respective round rods of different diameters which were integral multiples of the enameled wire conductor and left for a certain constant time at a specific temperature as indicated in Table 4. The diameter of a rod on which the wound enameled wire did not exhibit in its insulating coating film any cracks through which the conductor was visible to the naked eye when the enameled wire was returned to a temperature in the range of from 10 to 30 degrees C. was taken as the measured result.

Freon 22 resistance.—Each enameled wire sample was bent double on itself and then heat treated at 120 degrees C. for one hour. The sample thereafter was steeped for 24 hours in Freon 22 liquid (CHClF$_2$) at a temperature of 120 degrees C. and under a pressure of 80 kg./cm.² Each sample was then examined, and a sample which did not exhibit any blister-like swelling or pinholes was judged to be "good."

We claim:

1. A composition, suitable for use as an electrically insulating varnish, comprising a polyimide comprising recurring structural units each representable by the formula

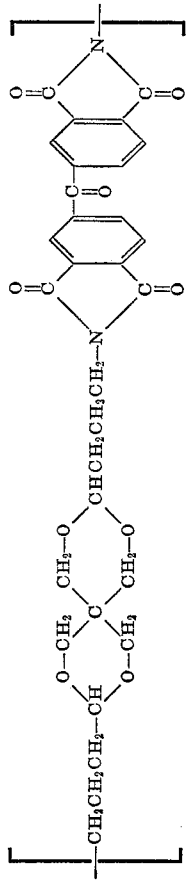

a convertible polyester, said convertible polyester being a phenolic-solvent-soluble condensate of substantially equivalent amounts of a dicarboxylic acid, a dihydric alcohol, and a member of the group consisting of polycarboxylic acids having at least three carboxyl groups and polyhydric alcohols having at least three hydroxyl groups, and being capable of further condensation, and a phenolic solvent, the ratio of polyester to polyimide being from 10:1 to 1:10 by weight.

2. A composition as claimed in claim 1 in which said convertible polyester is derived from terephthalic acid as a dicarboxylic acid component, ethylene glycol as a dihydroxy compound, and a polyhydroxy compound selected from the group consisting of glycerine as a trivalent or higher valency hydroxy compound and tris (hydroxymethyl) isocyanurate.

3. A composition as claimed in claim 1, which contains, with respect to 100 parts by weight of the resin content thereof, less than 50 parts by weight of at least one diisocyanate compound selected from the group consisting of diisocyanates and isocyanate generators.

4. A composition as claimed in claim 3 in which said diisocyanates are diphenylmethane-4,4'-diisocyanates.

References Cited

UNITED STATES PATENTS

| | | | |
|---|---|---|---|
| 2,982,754 | 5/1961 | Sheffer et al. | 260—33.4 |
| 3,122,451 | 2/1964 | Bunge | 717—232 |
| 3,440,215 | 3/1965 | Holub | 260—47 |
| 3,489,696 | 1/1970 | Miller | 260—2.5 |

MORRIS LIEBMAN, Primary Examiner

R. ZAITLEN, Assistant Examiner

U.S. Cl. X.R.

260—78 TF, 857